United States Patent
Jung et al.

(10) Patent No.: US 9,749,859 B2
(45) Date of Patent: Aug. 29, 2017

(54) ELECTRONIC DEVICE AND METHOD FOR UPDATING AUTHENTICATION INFORMATION IN THE ELECTRONIC DEVICE

(71) Applicant: Samsung Electronics Co., Ltd., Gyeonggi-do (KR)

(72) Inventors: Bu-Seop Jung, Gyeonggi-do (KR); Ki-Seok Kang, Gyeonggi-do (KR); Jun-Ho Lee, Gyeonggi-do (KR); Young-Kwan Chung, Gyeonggi-do (KR); Ji-Hyun Jung, Gyeonggi-do (KR); Yong-Hae Choi, Gyeonggi-do (KR); Jong-Mu Choi, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 57 days.

(21) Appl. No.: 14/542,752

(22) Filed: Nov. 17, 2014

(65) Prior Publication Data
US 2015/0143473 A1 May 21, 2015

(30) Foreign Application Priority Data
Nov. 15, 2013 (KR) ........................ 10-2013-0139270

(51) Int. Cl.
*H04W 12/06* (2009.01)
*H04W 4/00* (2009.01)
(Continued)

(52) U.S. Cl.
CPC ............. *H04W 12/06* (2013.01); *H04L 63/18* (2013.01); *H04L 63/20* (2013.01); *H04W 4/008* (2013.01); *H04W 84/12* (2013.01); *H04W 88/06* (2013.01)

(58) Field of Classification Search
CPC ..... H04W 88/06; H04W 12/06; H04W 4/008; H04L 63/18
See application file for complete search history.

(56) References Cited

U.S. PATENT DOCUMENTS

| 8,495,236 B1* | 7/2013 | Glasser ............. H04L 29/08522 709/203 |
| 2004/0179502 A1* | 9/2004 | Naghian ................ H04L 63/08 370/338 |

(Continued)

OTHER PUBLICATIONS

Wi-Fi Certified Passpoint™ (Release 1) Deployment Guidelines ; Wi-Fi Alliance Hotspot 2.0 Technical Task Group; Version 1.0—Oct. 2012.*

(Continued)

*Primary Examiner* — James Turchen
(74) *Attorney, Agent, or Firm* — Cha & Reiter, LLC

(57) ABSTRACT

An electronic device and method for updating authentication information in the electronic device is provided. The electronic device includes a short-range communication unit configured to provide a short-range communication and a controller configured to update information for authentication information from advertisement service information received from an Access Point (AP) identified through the short-range communication unit, download authentication information using the update information for authentication information, and connect the electronic device to the AP based on the authentication information.

18 Claims, 10 Drawing Sheets

(51) Int. Cl.
*H04L 29/06* (2006.01)
*H04W 84/12* (2009.01)
*H04W 88/06* (2009.01)

(56) References Cited

U.S. PATENT DOCUMENTS

| | | | | |
|---|---|---|---|---|
| 2006/0251258 A1* | 11/2006 | Lillie | H04L 63/061 | 380/270 |
| 2007/0076227 A1* | 4/2007 | Lindquist | H04M 1/72522 | 358/1.1 |
| 2007/0192832 A1* | 8/2007 | Qi | G06Q 20/3821 | 726/3 |
| 2008/0090520 A1* | 4/2008 | Camp | H04B 5/00 | 455/41.2 |
| 2008/0090595 A1* | 4/2008 | Liu | H04L 63/102 | 455/461 |
| 2009/0187983 A1* | 7/2009 | Zerfos | H04L 63/0823 | 726/10 |
| 2010/0008337 A1 | 1/2010 | Bajko | | |
| 2010/0275249 A1* | 10/2010 | McCann | H04L 63/08 | 726/5 |
| 2010/0313020 A1 | 12/2010 | Montemurro | | |
| 2012/0004900 A1 | 1/2012 | Chen et al. | | |
| 2012/0042371 A1* | 2/2012 | Gur | G06F 21/33 | 726/9 |
| 2012/0243524 A1 | 9/2012 | Verma et al. | | |
| 2012/0252405 A1* | 10/2012 | Lortz | G06F 8/60 | 455/410 |
| 2012/0265913 A1* | 10/2012 | Suumaki | H04W 4/008 | 710/303 |
| 2013/0007850 A1 | 1/2013 | Lambert | | |
| 2013/0024915 A1* | 1/2013 | Jones | H04W 12/06 | 726/5 |
| 2013/0024921 A1* | 1/2013 | Gupta | H04L 63/0823 | 726/6 |
| 2013/0036231 A1* | 2/2013 | Suumaki | H04W 12/04 | 709/228 |
| 2013/0070739 A1* | 3/2013 | McCann | H04W 48/16 | 370/338 |
| 2013/0076491 A1* | 3/2013 | Brandsma | H04B 5/0062 | 340/10.3 |
| 2013/0183935 A1* | 7/2013 | Holostov | H04W 12/06 | 455/411 |
| 2013/0198383 A1* | 8/2013 | Tseng | H04L 63/102 | 709/225 |
| 2013/0242965 A1* | 9/2013 | Horn | H04W 24/10 | 370/338 |
| 2013/0262850 A1* | 10/2013 | Canpolat | H04W 12/08 | 713/150 |
| 2013/0265985 A1* | 10/2013 | Salkintzis | H04W 48/08 | 370/331 |
| 2013/0268687 A1* | 10/2013 | Schrecker | H04W 12/06 | 709/229 |
| 2013/0272289 A1* | 10/2013 | Yao | H04W 48/14 | 370/338 |
| 2014/0050167 A1* | 2/2014 | Smedman | H04W 48/14 | 370/329 |
| 2014/0050320 A1* | 2/2014 | Choyi | H04L 63/08 | 380/270 |
| 2014/0051391 A1* | 2/2014 | Torres | H04W 12/06 | 455/411 |
| 2014/0068719 A1* | 3/2014 | Kiukkonen | H04W 12/08 | 726/4 |
| 2014/0075523 A1* | 3/2014 | Tuomaala | H04L 63/083 | 726/6 |
| 2014/0098804 A1* | 4/2014 | Calcev | H04W 76/02 | 370/338 |
| 2014/0187149 A1* | 7/2014 | Lortz | H04W 4/008 | 455/41.1 |
| 2014/0233406 A1* | 8/2014 | Chhabra | H04W 48/14 | 370/252 |
| 2014/0235167 A1* | 8/2014 | Jung | H04W 48/16 | 455/41.2 |
| 2014/0295913 A1* | 10/2014 | Gupta | H04W 74/02 | 455/552.1 |
| 2015/0038129 A1* | 2/2015 | Sundareswaran | H04L 41/0889 | 455/418 |
| 2015/0296416 A1* | 10/2015 | Lee | H04W 8/005 | 370/331 |
| 2016/0044586 A1* | 2/2016 | Koskinen | H04W 48/16 | 370/331 |

OTHER PUBLICATIONS

Lavrukhin, V., Nov. 2013. An overhead analysis of Access Network Query Protocol (ANQP) in hotspot 2.0 Wi-Fi networks. In ITS Telecommunications (ITST), 2013 13th International Conference on (pp. 266-271). IEEE.*
IEEE 802.11u Overview; Klaas Wierenga; May 7, 2009.*
How Interworking Works: A Detailed Look at 802.11u and Hotspot 2.0 Mechanisms; Jul. 2013; Ruckus.*

* cited by examiner

ELECTRONIC DEVICE AND METHOD FOR UPDATING AUTHENTICATION INFORMATION IN THE ELECTRONIC DEVICE

CLAIM OF PRIORITY

This application claims priority under 35 U.S.C. §119(a) of a Korean patent application filed on Nov. 15, 2013 in the Korean Intellectual Property Office and assigned Serial No. 10-2013-0139270, the entire disclosure of which is incorporated hereby incorporated by reference.

TECHNICAL FIELD

The present disclosure relates to an electronic device and method for updating authentication information in the electronic device, and more particularly to an electronic device and method for updating authentication information in the electronic device that enables the electronic device to conveniently update authentication information for accessing an Access Point.

BACKGROUND

Hotspot 2.0 is a new standard defined by Wi-Fi Alliance (WFA), for enabling a Wi-Fi electronic device to access a public Wi-Fi network without any separate input from the user.

For example, when SK Telecom supports Hotspot 2.0 and a user of an electronic device subscribed to the SK Telecom, the electronic device receives necessary information for connection through a 802.11u based Access Network Query Protocol (ANQP) and automatically access the SK Telecom Wi-Fi network without separate inputs from the user.

In general, in order for a user to access an AP in a Wi-Fi Hotspot network, the user needs to check a list of Access Points (APs) through a SCAN List, determine whether an AP is accessible, and configure connection settings for connection to the AP.

Hotspot 2.0 is based on the IEEE 802.11u standard, and provides more security in a WPA2-Enterprise scheme. Furthermore, Hotspot 2.0 provides various functionalities, such as data off-loading functionality for a future cellular network.

To access to a Hotspot 2.0 network, the electronic device performs network discovery on a current Wi-Fi network through ANQP queries/responses and is connected to a network that corresponds to a credential pre-stored in the electronic device. For example, a user who uses SKT SIM on a Wi-Fi network provided by an operator, such as SK Telecom accesses the Wi-Fi network by e.g., an EAP-SIM/AKA scheme.

On the other hand, in a venue in which a particular SIM is not served, not all the electronic devices pre-stores authentication information (or credentials) for the Wi-Fi network available in the venue. For example, if a user visits a hotel equipped with a system that supports Hotspot 2.0, an electronic device of the user may not have authentication information for accessing a Wi-Fi network of the hotel and is therefore unable to use the Wi-Fi network. To use the Wi-Fi network of the hotel, the user needs to obtain a Wi-Fi AP for authentication information for accessing the Wi-Fi network, e.g., identity (ID)/password information or a credential and then manually enter the authentication information to his/her electronic device.

SUMMARY

According, to embodiments of the present disclosure an electronic device is configured to update authentication information in the electronic device and enable the electronic device to update authentication information for connection to an AP.

The electronic device includes a short-range communication unit that provides a short-range communication functionality; and a controller that detects update information for authentication information from advertisement service information received from an Access Point (AP) identified through the short-range communication unit, downloads authentication information using the update information for authentication information, and connects to the AP using the authentication information.

According to another embodiment of the present disclosure, a method for updating authentication information in an electronic device is provided. The method includes detecting update information for authentication information included in advertisement service information received from an identified Access Point (AP); and connecting with the AP using authentication information included in the update information for authentication information.

Other aspects, advantages, and salient features of the invention will become apparent to those skilled in the art from the following detailed description, which, taken in conjunction with the annexed drawings, discloses exemplary embodiments of the invention

BRIEF DESCRIPTION OF THE DRAWINGS

The above and other features and advantages of the present invention will become more apparent by describing in detail exemplary embodiments thereof with reference to the attached drawings in which.

Throughout the drawings, like reference numerals will be understood to refer to like parts, components, and structures.

DETAILED DESCRIPTION

Figure 1:
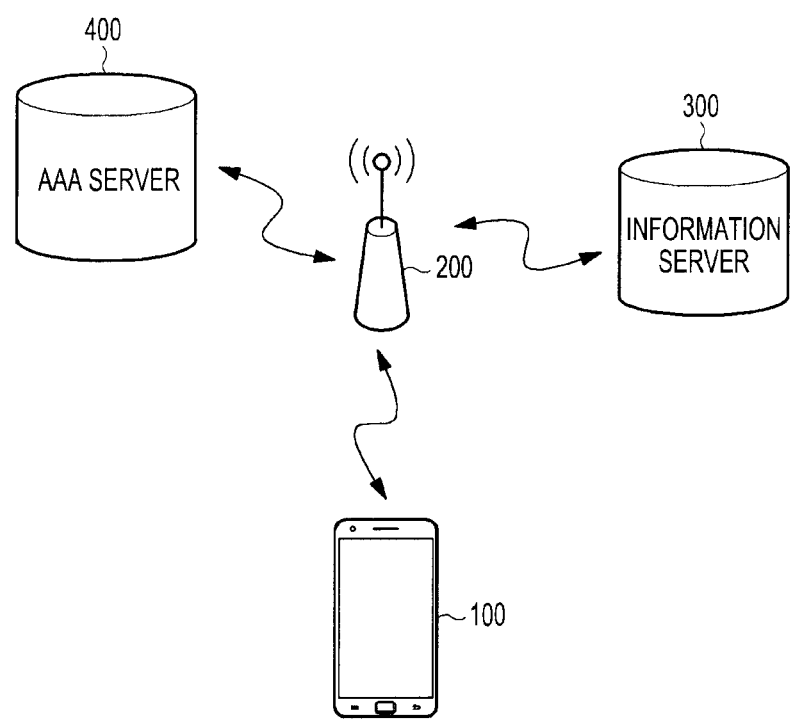
FIG. 1 is a schematic diagram of a system in which an electronic device receives service information from information server of an Access Point (AP) according to various embodiments of the present disclosure.

The following description provides various embodiments of the present disclosure with reference to the accompanying drawings. It includes various specific details to assist in that understanding but these are to be regarded as merely exemplary and various modifications may be made to the embodiments.

The embodiments of the disclosure may, however, be embodied in many different forms and should not be construed as limited to the embodiments set forth herein; rather, these embodiments are provided so that this disclosure will be thorough and complete, and will fully convey the scope of the embodiments of the disclosure to those skilled in the art. Like numbers refer to like elements throughout.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For examples, "A or B" may include A, or include B, or include both A and B.

Ordinal numbers as used herein, such as "first", "second", etc., may modify various components of various embodiments, but do not limit those components. For example, these terms do not limit order and/or importance of corresponding elements, components, regions, layers and/or sections. These terms are only used to distinguish one element, component, region, layer or section from another region, layer or section. For example, a first user device and a second user device refers to two different user devices. Thus, a first element, component, region, layer or section discussed below could be termed a second element, component, region, layer or section without departing from the teachings of the embodiments of the present disclosure.

When the term "connected" or "coupled" is used, a component may be directly connected or coupled to another component or may be indirectly connected or coupled to another component via another new component. However, if a component is said to be "directly connected" or "directly coupled" to another component, it should be interpreted as literally as it says.

The terminology used herein is for the purpose of describing particular embodiments only and is not intended to be limiting of the embodiments of the present disclosure.

It is to be understood that the singular forms "a," "an," and "the" include plural references unless the context clearly dictates otherwise.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to various embodiments of the present disclosure, the electronic device is a communication device, which may include one or more of various devices, such as smartphones, tablet Personal Computers (tablet PCs), mobile phones, video phones, e-book readers, desktop PCs, laptop PCs, netbook computers, Personal Digital Assistants (PDAs), Portable Multimedia Players (PMPs), mp3 players, mobile medical instrument, electronic bracelets, electronic necklaces, electronic appcessories, cameras, wearable devices, electronic clocks, wristwatches, home appliances (e.g., refrigerators, air conditioners, ovens, microwaves, washing machines, air purifiers, etc.), artificial intelligence robots, televisions (TVs), digital video disk players, audio players, medical equipment (e.g., Magnetic Resonance Angiography (MRA), Magnetic Resonance Imaging (MRI), Computed Tomography (CT), ultrasound, etc.), navigation devices, Global Positioning System (GPS) receivers, Event Data Recorders (EDRs), Flight Data Recorders (FDRs), set-top boxes, TV boxes (e.g., HomeSync™ from Samsung, AppleTV™ or GoogleTV™, etc.), electronic dictionaries, vehicle infotainment devices, electronic equipment for ship (e.g., a navigation system for ship, gyro compass, etc.), avionic devices, security devices, electronic clothings, electronic keys, camcorders, game consoles, Head-Mounted Displays (HMDs), flat panel display devices, electronic photo frames, electronic albums, furniture or buildings/structures with a communication functionality, electronic boards, electronic signature receiving devices, wearable devices, projectors, etc., or any combination thereof. It will be obvious to people with ordinary skill in the art that the electronic device is not limited to the aforementioned devices.

FIG. 1 is a schematic diagram of a system in which an electronic device receives service information from an information server of an Access Point (AP) according to various embodiments of the present disclosure.

Referring to FIG. 1, the electronic device 100 may scan or identify Access Point (AP) 200 that provides an advertisement service and supports Hotspot 2.0, and detect update information for authentication information necessary for accessing the AP 200 from advertisement service information received from the AP 200. Using the update information for authentication information the electronic device 100 is automatically connected to the AP 200.

The update information for authentication information includes at least one of information about a Universal Resource Locator (URL) from which the authentication information is downloaded, information about connection to a public AP for downloading authentication information, and the authentication information.

According to embodiments, if the update information for authentication information includes the URL information, the electronic device 100 displays the URL information, accesses the URL and downloads authentication information from the URL if the URL information is selected.

Alternatively, if the update information for authentication information includes the URL information and information about connection to the public AP (e.g., SSID), the electronic device 100 displays the URL information, and accesses the public AP using the information about connection to the public AP if the URL information is selected. The electronic device 100 accesses the URL by through the public AP and downloads the authentication information from the URL.

According to an alternate embodiment, if the update information includes the authentication information, the electronic device 100 displays a message indicating whether to store the authentication information, detects and downloads the authentication information from the advertisement service information if the user selects to store the authentication information. According to a alternate embodiment, the electronic device 100 detects the authentication information from the advertisement service information and stores the authentication information in the electronic device 100.

According to embodiments, electronic device 100 sends user information of the electronic device 100 to the AP 200, and receives the advertisement service information that includes the update information for authentication information from the AP 200 if the user information is validated. The user information includes at least one of an identity (ID) valid for a venue where the electronic device 100 is located and an unique ID of the electronic device 100.

To store the authentication information using the update information for authentication information included in the advertisement service information, the electronic device 100 stores the authentication information by matching the authentication information with venue information detected from the advertisement service information.

Configuration of the electronic device 100 will be discussed later in details with reference to FIG. 2.

In operation, the AP 200 provides the electronic device 100 with advertisement service and Hotspot 2.0 functionalities.

The AP 200 sends advertisement service information that includes the update information for authentication information received from an information server 300. The AP 200 sends to the electronic device information about the AP 200 required for connection to the AP 200, which is received from the information server 300.

According to an embodiment, the AP 200 includes a first AP controller 210 to provide the advertisement service functionality and a second AP controller 220 for providing the Hotspot 2.0 functionality. The first AP controller 210 transmits to the electronic device 100, advertisement service information that includes update information for authentication information, which is received from the information server 200.

The second AP controller 220 transmits the electronic device 100 information about the second AP required for connection to the second AP, which is received from the information server 300.

The information server 300 may send the AP 200 the advertisement service information that includes the update information for authentication information and the information about the AP 200 required for connection to the AP 200, upon request of the AP 200.

According to an embodiment the information server 300 may be divided into a first server 310 for providing the advertisement service functionality and a second server 320 to provide the Hotspot 2.0 functionality. The first server 310 transmits the first AP advertisement service information that includes the update information for authentication information, in response to the request of the first AP. The second server 320 transmits to the second AP controller 220 the information required for connection to the second AP controller 220, in response to the request of the second AP controller 220.

The information server 300 sends the AP 200 at least one of information about a URL from which the authentication information is downloaded, information for connecting to a public AP for downloading the authentication information, and the authentication information in the advertisement service information.

Upon reception of a request for an advertisement service which includes user information from the AP 200, the information server 300 sends the AP 200 the update information for authentication information in the advertisement service information only if the user information exists in a database (DB) of the information server 300.

An Authentication, Authorization, and Accounting (AAA) server 400 is an authentication server for authenticating the electronic device 100 for connection between the electronic device 100 and the AP 200.

Figure 2:
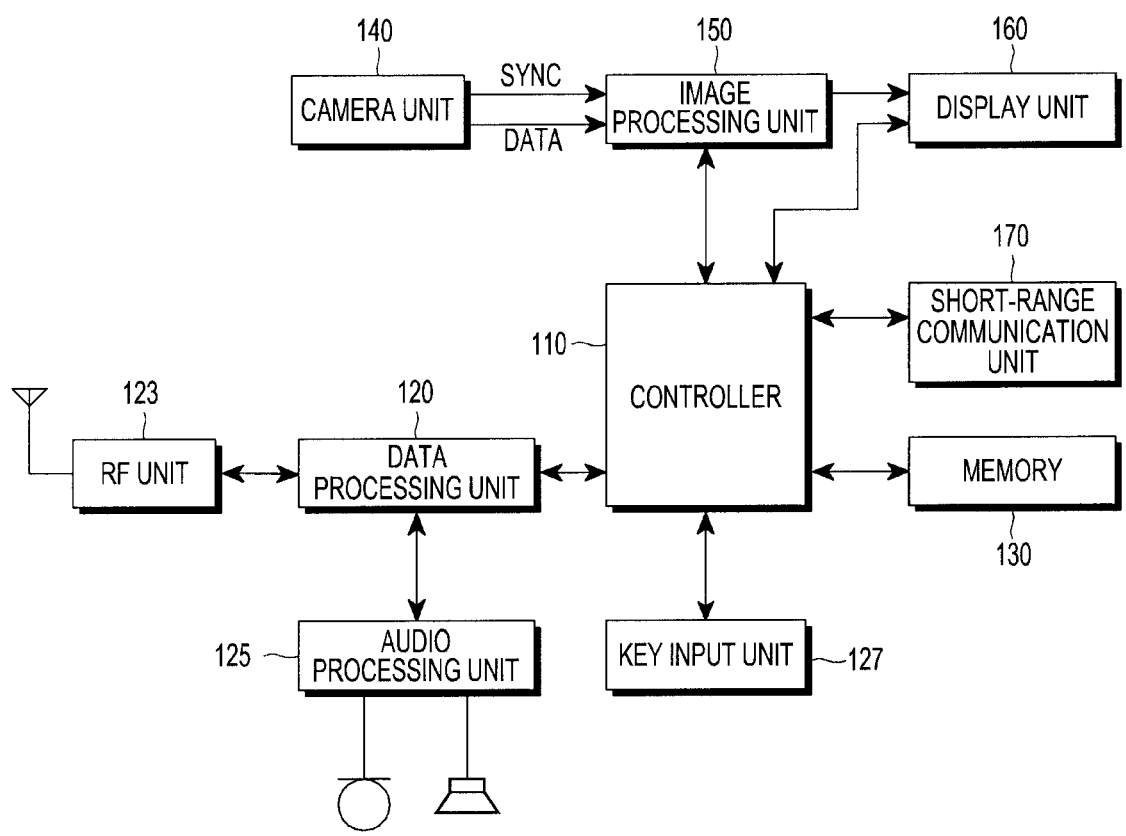
FIG. 2 is a block diagram of an electronic device, according to various embodiments of the present disclosure.

FIG. 2 is a block diagram of the electronic device 100, according to embodiments of the present disclosure. Referring to FIG. 2, Radio Frequency (RF) unit 123 that enable has a wireless communication. The RF unit 123 includes an RF transmitter that converts and amplifies a signal for transmission and an RF receiver that amplifies low-noise and down converts a received signal. Data processing unit 120 includes a transmitter that encodes and modulates the signal for transmission and a receiver that demodulates and decodes the received signal. According to an embodiment, data processor 120 includes a modem and a codec (not shown). The codec includes a data codec for handling packet data or the like and an audio codec for handling an audio signal, such as voice. Audio processing unit 125 reproduces a received audio signal output from the audio codec of the data processing unit 120 or sends an audio signal for transmission which is produced by a microphone to the audio codec.

According to an embodiment, key input unit 127 includes alphanumeric keys and functional keys to perform various functions.

Memory 130 stores programs and data. The memory 130 stores programs to control general operation of the electronic device 100 and to enable the electronic device 100 to automatically update authentication information required for connection to an AP 200. The memory 130 also temporarily stores data generated in the course of performing the programs.

According to embodiments, the memory 130 stores authentication information downloaded using the update information for authentication information detected from the advertisement service information, by matching the authentication information with venue information detected from the advertisement service information.

Controller 110 controls overall operations of the electronic device 100.

According to embodiments controller 110 detects update information for authentication information included in the advertisement service information received from an AP identified through a short-range communication unit 170, in accordance with an embodiment of the present disclosure. The controller 110 controls the electronic device 100 to access to the AP with the authentication information downloaded using the update information for authentication information.

The update information for authentication information includes at least one of information about a URL from which the authentication information may be downloaded, information about connection to a public AP for downloading authentication information, and the authentication information.

According to embodiments controller 110 identifies APs around the electronic device 100 through the short-range communication unit 170, if a Wi-Fi network is selected by the user. The controller 110 transmits a request for an advertisement service to the identified AP 200 and based on the request, receives advertisement service information from the AP 200. Upon reception of the advertisement service from the AP 200, the controller 110 extracts and displays URL information for downloading the authentication information included in the advertisement service information.

When the URL is selected, the controller 110 accesses the URL to download the authentication information, and uses the downloaded authentication information to make an automatic connection to the AP 200.

In another embodiment, the controller 110 identifies APs around the electronic device 100 through the short-range communication unit 170 if a Wi-Fi network is selected by the user of the electronic device 100. The controller 110 sends a request for an advertisement service to the identified AP 200 and based on the request, receives advertisement service information from the AP 200. The controller 110 extracts URL information for downloading the authentication information included in the advertisement service information and information about connection to a public AP (e.g., SSID), and then displays the URL information. Upon selection of the URL information, the controller 110 accesses the public AP using the information about connection to the public AP. The controller 110 accesses the URL through the public AP, downloads the authentication information from the URL, and connects the electronic device 100 to the AP 200 based on the downloaded authentication information.

In yet another embodiment, the controller 110 identifies APs around the electronic device 100 through the short-range communication unit 170 if a Wi-Fi network is selected by the user of the electronic device 100. The controller 110 sends a request for an advertisement service, which includes user information, to the identified AP 200. If the user information is validated, the controller 110 receives advertisement service information that includes information about a URL from which authentication information may be downloaded from the AP 200 in return for the request, extracts the URL information, and display the URL information. When the URL is selected, the controller 110 accesses the URL, downloads the authentication information from the URL, and based on the authentication information connecting the electronic device 100 to the AP 200. Alternately, if the user information is validated, the controller 110 receives advertisement service information that does not include information about a URL from which the authentication information is downloaded from the AP 200 in response to the request.

According to embodiments user information includes at least one of an ID valid for the venue in which the electronic device 100 is located and a unique ID of the electronic device 100. Whether the user information is valid or invalid is based on a determination of whether the user information exists in a DB of the information server 300 connected to the AP 200.

According to another embodiment, the controller 110 identifies APs around the electronic device 100 through the short-range communication unit 170 if a Wi-Fi network is selected by the user of the electronic device 100. The controller 110 sends a request for an advertisement service to the identified AP 200, and in response to the request, receives advertisement service information from the AP 200, detects venue information from the advertisement service information, and determines whether there is authentication information stored in the electronic device 100 that matches the venue information. If there is authentication information stored in the electronic device 100 that matches the venue information, the controller 110 enables the electronic device 100 to be automatically connected to the AP 200 using the stored authentication information. Alternatively, if there is no authentication information stored in the electronic device 100 that matches the venue information, the controller 110 extracts URL information for downloading authentication information from the advertisement service information and displays the URL information. Upon selection of the URL information, the controller 110 accesses the URL, downloads the authentication information from the URL, stores the authentication information by matching it with venue information, and enables connection to the AP 200 using the authentication information.

According to an embodiment, short-range communication unit 170 provides a short-range communication functionality, such as Wi-Fi, Wibro, mobile Wimax, etc. For example, the short-range communication module 40 provides the user with the short-range communication functionality by accessing an AP according to a IEEE 802.11 standard. In this example, the short-range communication module 40 supports advertisement service and Hotspot 2.0 functionalities according to the IEEE 802.11u specification.

Accordingly to this embodiment, the controller 110 identifies APs around the electronic device 100. The control unit 110 controls the short-range communication unit 40 to repeatedly perform AP identification including at least one of scanning, listening, and searching for channel at certain time intervals based on the IEEE 802.11 standard.

According to an embodiment camera unit 140 includes a camera sensor for capturing an image and converting an optical signal of the captured image into an electrical analog signal, and a signal processing unit for converting the analog signal of the image captured by the camera sensor into digital data. Camera sensors and signal processing units are known in the art. For example, the camera sensor may be one of a Charge Coupled Device (CCD) or Complementary Metal-Oxide Semiconductor (CMOS) sensor, and the signal processing unit may be implemented with a Digital Signal Processor (DSP). Further, the camera sensor and the signal processor may be integrated in a single unit, or may be implemented separately as is known in the art.

According to embodiments image processing unit 150 performs Image Signal Processing (ISP) to display an image signal output from the camera unit 140 in a display unit 160. The ISP includes at least one of gamma correction, interpolation, spatial modification, image effect, image scaling, Automatic White Balance (AWB), Auto Exposure (AE), Auto Focus (AF), etc. According to an embodiment, the image processing unit 150 processes the image signal output from the camera unit 140 on a frame basis and output the frame image data to conform to characteristics and size of the display unit 160. According to an embodiments the image processing unit 150 includes an image codec for compressing the frame image data to be displayed in the display unit 160 according to a set scheme or reconstructing compressed image data to original frame image data. The image codec may be a Joint Photographic Experts Group (JPEG) codec, a Moving Picture Experts Group (MPEG) 4 codec, Wavelet codec, or the like. The controller 110 controls the image processing unit 150 to perform On Screen Display (OSD) capability, and outputs OSD data according to the size of the display screen.

According to an embodiment the display unit 160 displays the image signal output from the image processing unit 150 and user data output from the controller 110 on the screen. According to an embodiment the display unit 160 uses a Liquid Crystal Display (LCD), in which case the display unit 160 further includes an LCD controller, a memory to store image data, and an LCD display device. In this regard, if the LCD is implemented in a touch screen method, the display unit 160 is used to input data into the electronic device 100, and display input keys, such as the key input unit 127 on the screen.

According to an embodiment the display unit 160 is implemented as a touch screen unit in the touch screen method, the touch screen unit include a touch screen panel having a plurality of sensor panels. The plurality of sensor panels includes capacitive sensor panels for recognizing hand touches and electromagnetic inductive sensor panels for detecting minute touch details from e.g., touch pens.

According to embodiments, if the user of the electronic device 100 selects a Wi-Fi network available in the venue where the electronic device 100 is located, the display unit 160 displays a message to provide necessary authentication information to access the Wi-Fi network. For example, an instruction may be displayed such as e.g., "Just Click to Use Secure Wi-Fi network provided by TASTY coffee".

Embodiments of the electronic device 100 for updating authentication information will be discussed in more detail in connection with FIGS. 3 to 6. Although advertisement service and Hotspot 2.0 functionalities are shown to be separately provided by first and second APs and first and second servers, respectively, in the embodiments of FIGS. 3 to 6, it will be appreciated that the functionalities may be provided by a single AP and a single information server in other embodiments.

According to embodiments a single AP supports both the advertisement service and Hotspot 2.0 service, and the electronic device 100 sends requests for both of the two services at a time when a query about an initial advertisement service is made. The electronic device 100 based on the result of the query, connects with the service without making a subsequent query about the Hotspot 2.0 after the authentication information is downloaded.

Figure 3A:
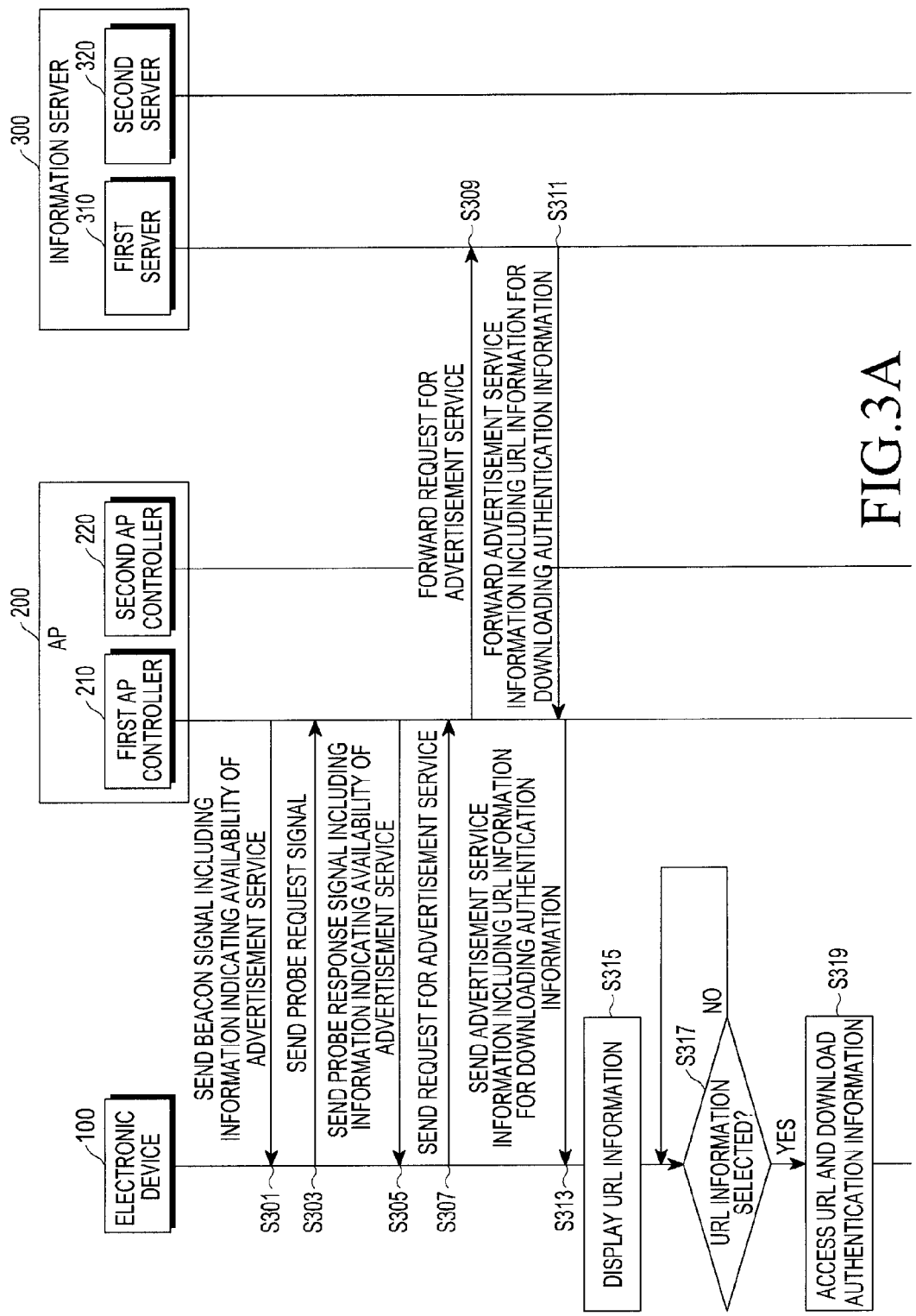
FIG. 3A and FIG. 3B are flowcharts illustrating a method for updating authentication information in an electronic device according to an embodiment of the present disclosure.
Figure 3B:
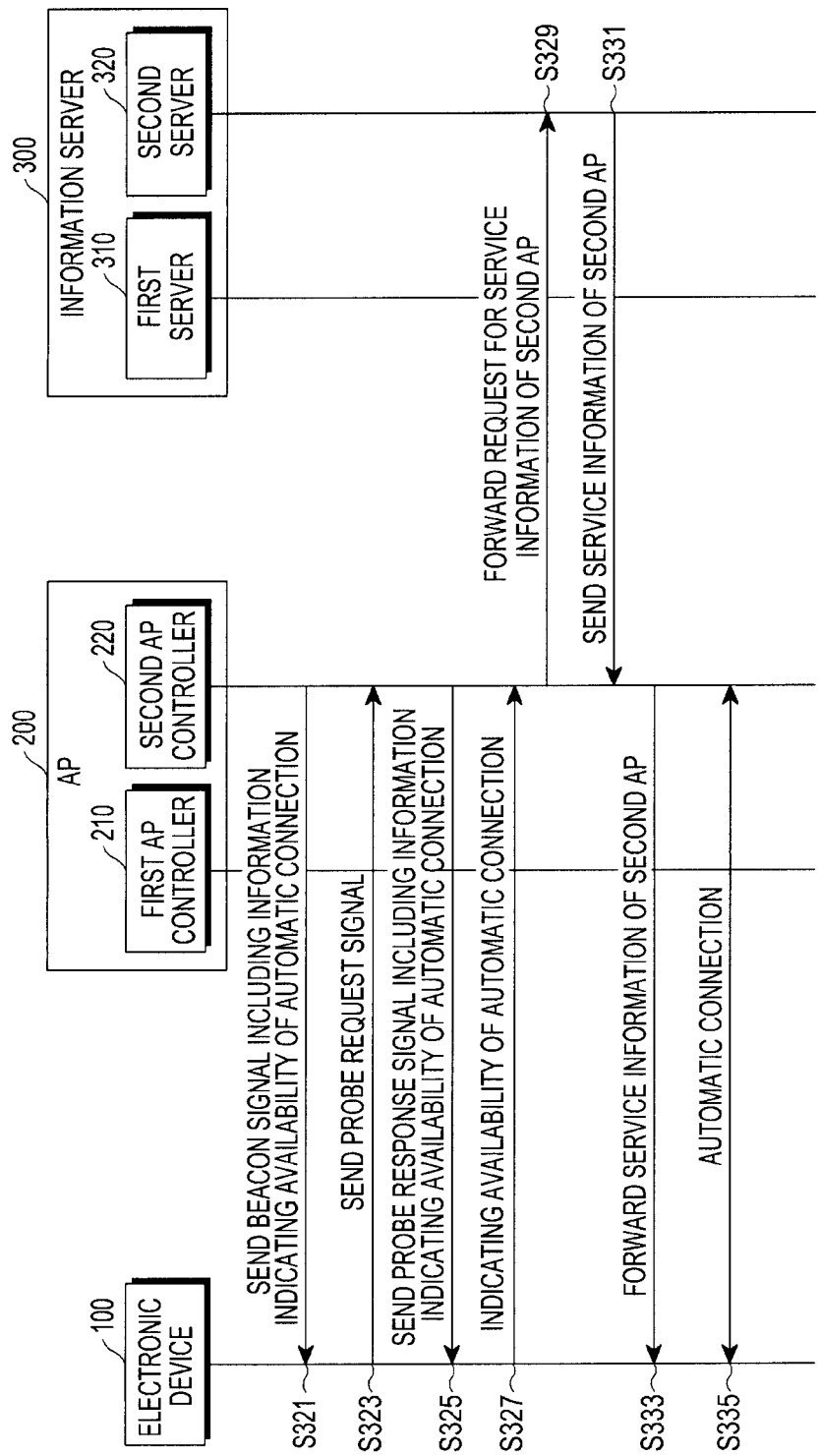

FIGS. 3A and 3B are flowcharts illustrating a method for updating authentication information in an electronic device, according to an embodiment of the present disclosure.

The embodiment will be explained in conjunction with FIGS. 1 and 2.

Referring to FIGS. 3A and 3B, in S301, the first AP 210 periodically sends a beacon signal that includes information indicating availability of advertisement services. If the electronic device 100 that turns on the Wi-Fi networking function, enters a Wi-Fi network area of a venue that supports 802.11u based advertisement services, the controller 110 identifies surrounding APs and determines whether an identified AP in the network is able to support advertisement services.

In S303, the controller 110 sends a probe request signal. In S305, the first AP 210 that receives the probe request signal sends the electronic device 100 a probe response signal that includes the information indicating availability of advertisement services.

According to embodiments, the controller 110 determines from the probe response signal received from first AP 210, that the first AP 210 is able to support advertisement services. In S307, a request for an advertisement service is sent to the first AP 210. The request for the advertisement service S307 be sent via a GAS initial request, which is an action frame specified based on the 802.11u standard.

In S309, upon receiving the request for the advertisement service from the electronic device 100, the first AP 210 forwards the request for the advertisement service to the first server 310.

In S311, in response to the request for the advertisement service, the first server 310 sends the first AP 210 advertisement service information that includes information about a URL from which authentication information is downloaded.

In S313, upon receiving the advertisement service information including the URL information from the first server 210, the first AP 210 forwards the advertisement service information that includes the URL information to the electronic device 100. The advertisement service information is forwarded from the first AP 210 to the electronic device 100 via a GAS initial response, which is an action frame specified based on the 802.11u standard.

Upon reception of the advertisement service information from the first AP 210 the controller 110 of the electronic device 100 extracts the URL information from the advertisement service information to download the authentication information in S313, and in S315 displays the URL information in the display unit 160 for downloading necessary authentication information for connection to an AP provided in the venue where the electronic device 100 is located.

In S317, upon determining that the URL information has been selected, In S319, the controller 110 accesses the URL via a data network, downloads authentication information and stores the authentication information in the memory 130. When the controller 110 is connected to the URL, a page for downloading Hotspot 2.0 authentication information is displayed in the electronic device 100.

In S321, after the authentication information is downloaded, in operation 321, the second AP 220 may periodically transmits a beacon signal that includes information indicating availability of automatic connection, e.g., information indicating that Hotspot 2.0 is supported. In S323, the controller 110 sends a probe request signal. In S325, the second AP 220 receives the probe request signal and transmits the electronic device 100 a probe response signal that includes the information indicating availability of automatic connection.

According to embodiments, in S327 controller 110 determines from the probe response signal received from the second AP 220 that the second AP 220 is an AP that enables automatic connection, i.e., that supports Hotspot 2.0, and sends the second AP 220 a request for service information of the second AP 220 for automatic connection. According to embodiments, the request for service information of the second AP 220 be sent via GAS initial request, which is an action frame specified by the 802.11u standard.

In S329, upon reception of the request for service information of the second AP 220 from the electronic device 100, the second AP 220 forwards the request to the second server 320.

In S331, upon reception of the request for service information of the second AP 220 from the second AP 220, the second server 320 sends service information of the second AP 220 to the second AP 220.

In S333, upon reception of the service information of the second AP 220 from the second server 320, the second AP 320 forwards the service information of the second AP 220 to the electronic device 100.

In S335, after the service information of the second AP 220 is received by the electronic device 100 from the second AP 220 and it is determined that authentication information included in the service information of the second AP 220 corresponds to authentication information stored in the electronic device 100, the electronic device 100 is connected to the second AP 220.

While the embodiment of FIGS. 3A and 3B illustrate an embodiment where a single piece of URL information is provided in a single venue, according to an embodiment, the display unit 160 of the electronic device 100 displays multiple pieces of URL information provided in multiple venues if the electronic device 100 is located in an area where the multiple venues overlap. The user selects a piece of URL information of a desired venue from among the multiple pieces of URL information and downloads authentication information from the selected URL.

Furthermore, although the embodiment of FIGS. 3A and 3B illustrate an embodiment where advertisement service information including the URL information for downloading the authentication information is provided to the electronic device 100, according to an alternate embodiment the authentication information is directly included and sent in the advertisement service information to the electronic device 100.

Figure 4A:
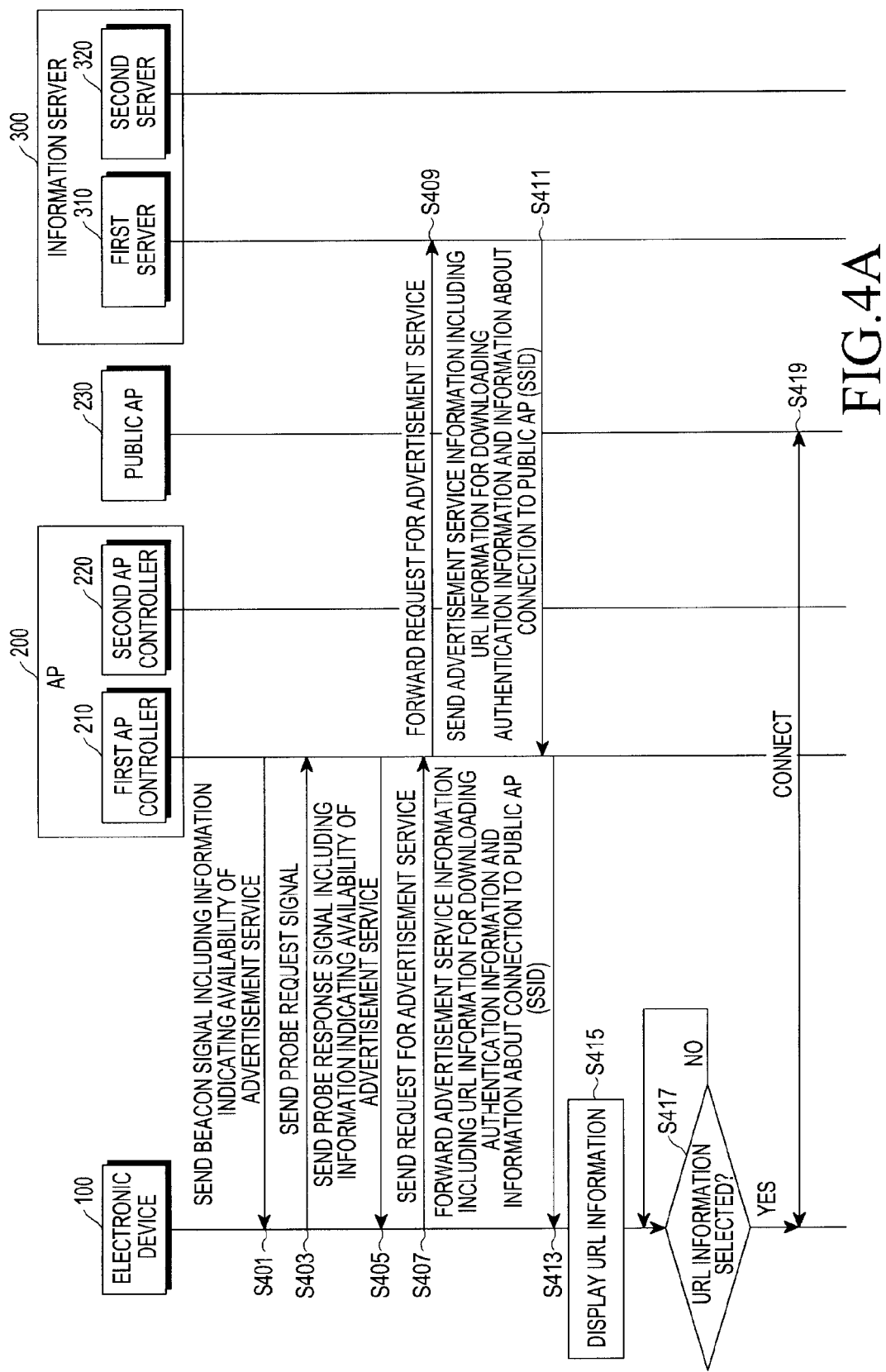
FIG. 4A and FIG. 4B are flowcharts illustrating a method for updating authentication information in an electronic device according to another embodiment of the present disclosure.
Figure 4B:
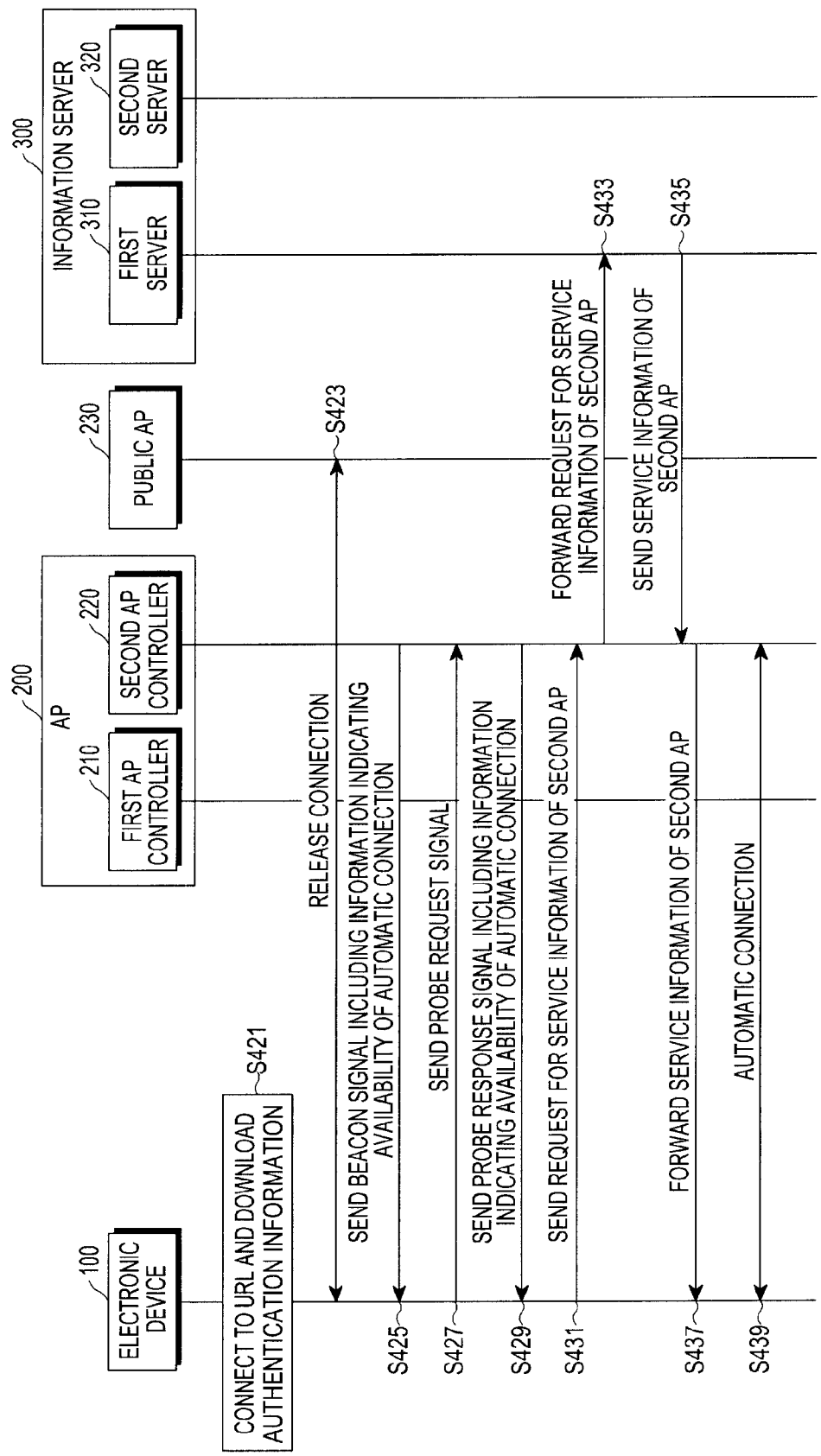

FIGS. 4A and 4B are flowcharts illustrating a method for updating authentication information in an electronic device, according to another embodiment of the disclosure.

The embodiment will be explained in conjunction with FIGS. 1 and 2.

Referring to FIGS. 4A and 4B, in operation S401, the first AP 210 periodically transmits a beacon signal that includes information indicating availability of advertisement services. If the electronic device 100 that turns on the Wi-Fi networking function, enters a Wi-Fi network area of a venue that supports 802.11u based advertisement services, the controller 110 performs identifying surrounding APs and determining whether an identified AP in the network is able to support advertisement services.

During transmitting in S401, in S403, the controller 110 sends a probe request signal, and in S405, the first AP 210 that received the probe request signal sends the electronic device 100 a probe response signal that includes the information indicating availability of advertisement services.

The controller 110 determines from the probe response signal received from the first AP 210 that the first AP 210 is able to support advertisement services and in S407, transmits a request for an advertisement service to the first AP 210. The request for the advertisement service is transmitted to the first AP 210 via a GAS initial request, which is an action frame specified based on the 802.11u standard.

In S409, upon reception of the request for the advertisement service from the electronic device 100, the first AP 210 may forward the request for the advertisement service to the first server 310.

In S411, upon receiving the request from the first AP 210, the first server 310 sends the first AP 210 advertisement service information including URL information for downloading authentication information and information about connection to a public AP (e.g., SSID), in operation 411. The information about connection to the public AP, SSID, may be one of an SSID of a separate free AP that is temporarily accessed by the electronic device 100 at the current venue, or an SSID for temporary use among multiple SSIDs for the second AP.

In S413, upon receiving the advertisement information including the URL information and the information about connection to the public AP from the first server 210, the first AP 210 forwards the advertisement information to the electronic device 100. The advertisement service information is forwarded from the first AP 210 to the electronic device 100 via a GAS initial response, which is an action frame specified based on the 802.11u standard.

When the advertisement service information is received by the electronic device 100 from the first AP 210, the controller 110 extracts the URL information and the connection information to the public AP from the advertisement service information, and in S415, the URL information in the display unit 160 is displayed.

In S417 if it is determined that the URL information is selected, In S419, the controller 110 connects the electronic device 100 to the public AP 230 using the connection information about connection to the public AP. In S421, the controller 110 accesses the URL by the public AP 230 and downloads and stores the authentication information in the memory 130 from the URL. When the controller 110 is connected to the URL, a page for downloading Hotspot 2.0 authentication information is displayed in the electronic device 100.

In S423, after downloading the authentication information, the controller 110 releases the connection to the public AP 230.

Since S425 to S439 are the same as S321 to S335 of FIGS. 3A and 3B, described above, the description of these steps will are not repeated here.

Figure 5A:
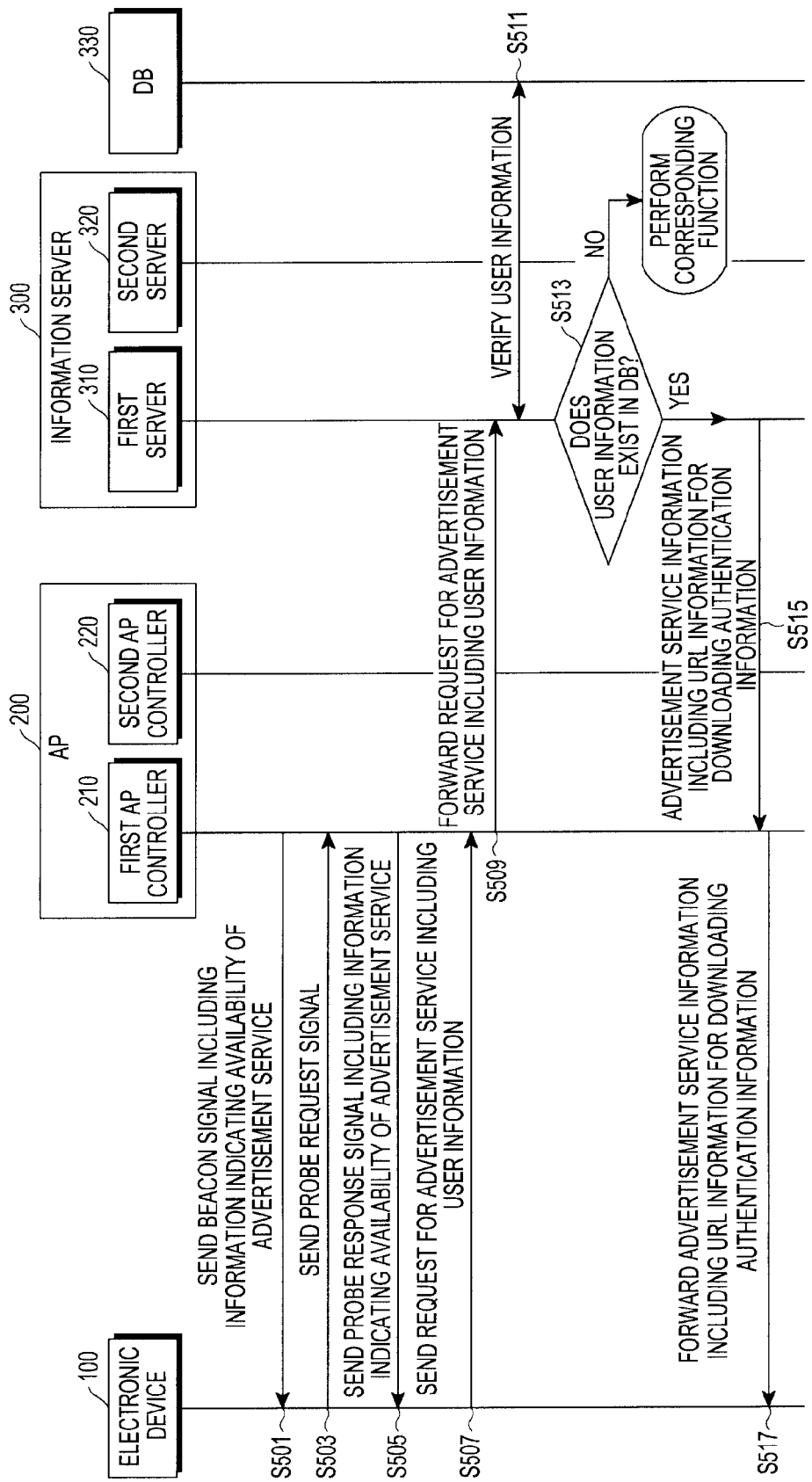
FIG. 5A and FIG. 5B are flowcharts illustrating a method for updating authentication information in an electronic device, according to another embodiment of the present disclosure.
Figure 5B:
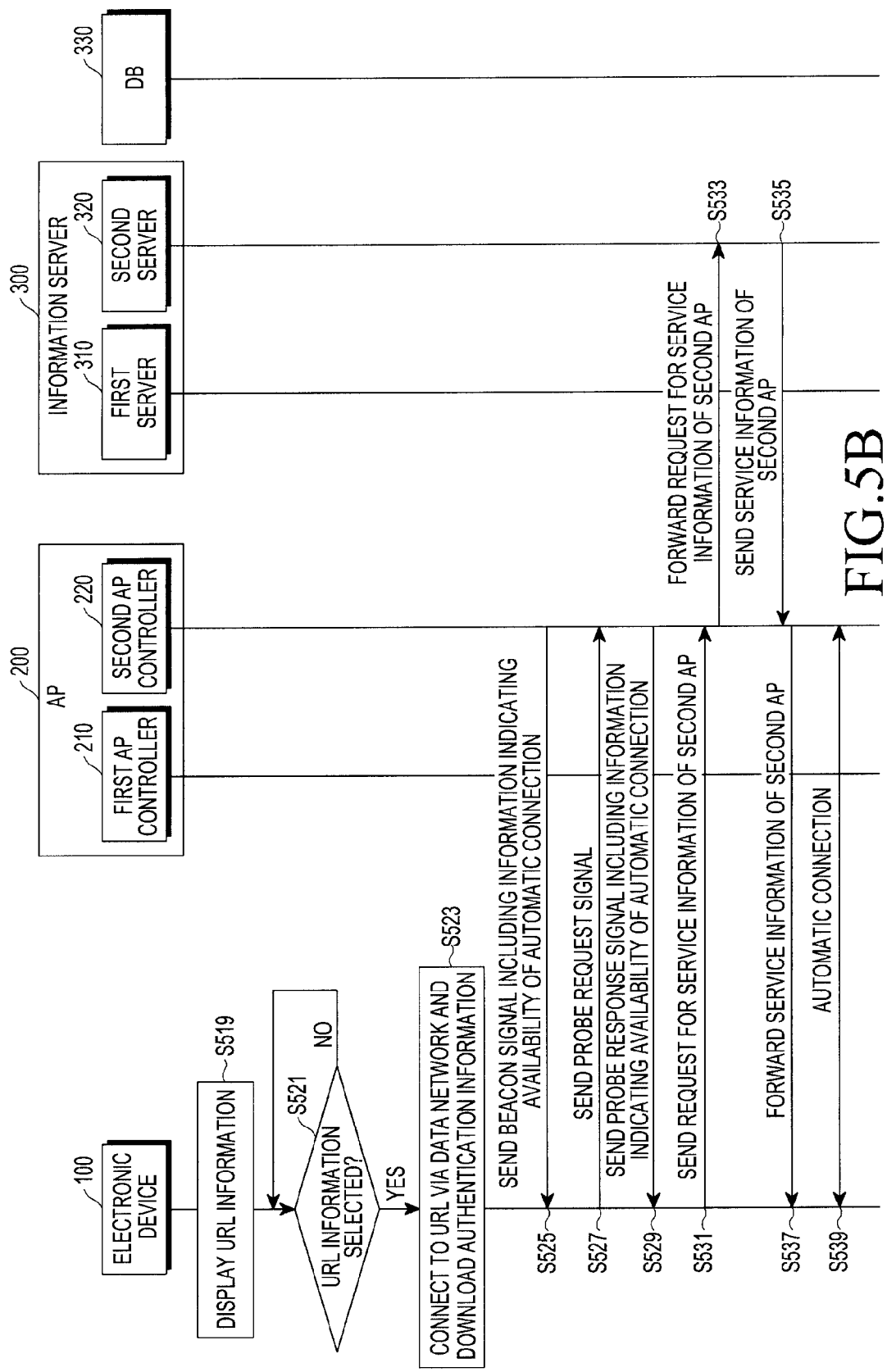

FIGS. 5A and 5B are flowcharts illustrating a method for updating authentication information in an electronic device, according to another embodiment of the disclosure.

The embodiment will be explained in conjunction with FIGS. 1 and 2.

Referring to FIGS. 5A and 5B, in S501, the first AP 210 controller periodically transmits a beacon signal that includes information indicating availability of advertisement services. If the electronic device 100 that has Wi-Fi networking enabled, enters a Wi-Fi network area of a venue that supports 802.11u based advertisement services, the controller 110 identifies surrounding APs and determines whether an identified AP in the network is able to support advertisement services.

In S503, the controller 110 sends a probe request signal, and in S505, the first AP controller 210 that receives the probe request signal sends the electronic device 100 a probe response signal that includes the information indicating availability of advertisement services.

In the controller 110 determines, based on the probe response signal received from the first AP controller 210, that the first AP controller 210 is able to support advertisement services, in S507, the controller 110 transmits the first AP controller 210 a request for an advertisement service, the request including user information (e.g., an ID valid for the venue where the electronic device 100 is located or a unique ID of the electronic device). The request for the advertisement service is transmitted to the first AP controller 210 via a GAS initial request, which is an action frame specified based on the 802.11u standard. Upon reception of the request for the advertisement service from the electronic device 100, in S509, the first AP 210 controller forwards the request for the advertisement service to the first server 310.

In S511, upon receiving the request for the advertisement service from the first AP controller 210, the first server 310 determines whether the user information included in the request for the advertisement service exists in a DB 330 of the first server 310. In S513, if it is determined that the user information exists in the DB 330, in S515, the first server 310 sends the first AP 210 advertisement service information including URL information for downloading authentication information.

In S517, upon receiving the advertisement service information including the URL information from the first server 210, the first AP 210 controller forwards the advertisement service information that includes the URL information to the electronic device 100. The advertisement service information is forwarded from the first AP 210 to the electronic device 100 via a GAS initial response, which is an action frame specified based on the 802.11u standard.

Upon reception of the advertisement service information from the first AP, in S519 the electronic device 100 extracts the URL information for downloading the authentication information from the advertisement service information, and displays the URL information in the display unit 160 for downloading necessary authentication information for connection to an AP provided in the venue where the electronic device 100 is located.

Upon determining in S521 that the URL information has been selected, in S523 the controller 110 accesses the URL, downloads the authentication information from the URL and stores the authentication information in the memory 130. When the controller 110 is connected to the URL, a page for downloading Hotspot 2.0 authentication information is displayed in the electronic device 100.

Since subsequent operations S525 to S529 after the authentication information is downloaded are the same as operations S321 to S335 of FIGS. 3A and 3B, described above, description of them will not be repeated here.

While the embodiment of FIGS. 5A and 5B illustrates an occasion where advertisement service information including URL information for downloading authentication information is provided to the electronic device 100, according to an embodiment, information about connection to a public AP is additionally included in the advertisement service information or the authentication information is directly included and transmitted in the advertisement service information to the electronic device 100.

Although FIGS. 5A and 5B illustrates an embodiment where a server provides authentication information only to an electronic device that has user information registered in the DB of the server, according to another embodiment, the server provides advertisement service information including URL information for downloading authentication information for an electronic device at the request of the electronic device regardless of whether it is registered in the DB, and a page for urging the user to enter ID and password required at the venue is displayed if the URL information displayed in the display unit 160 of the electronic device 100 is selected. Then, if the ID and password entered corresponds to an ID registered, a page providing the authentication information is displayed. According alternate embodiments, the ID and password is one that was registered in the venue when the user of the electronic device 100 signed up for the venue online, or one that was provided directly by the venue offline.

Figure 6A:
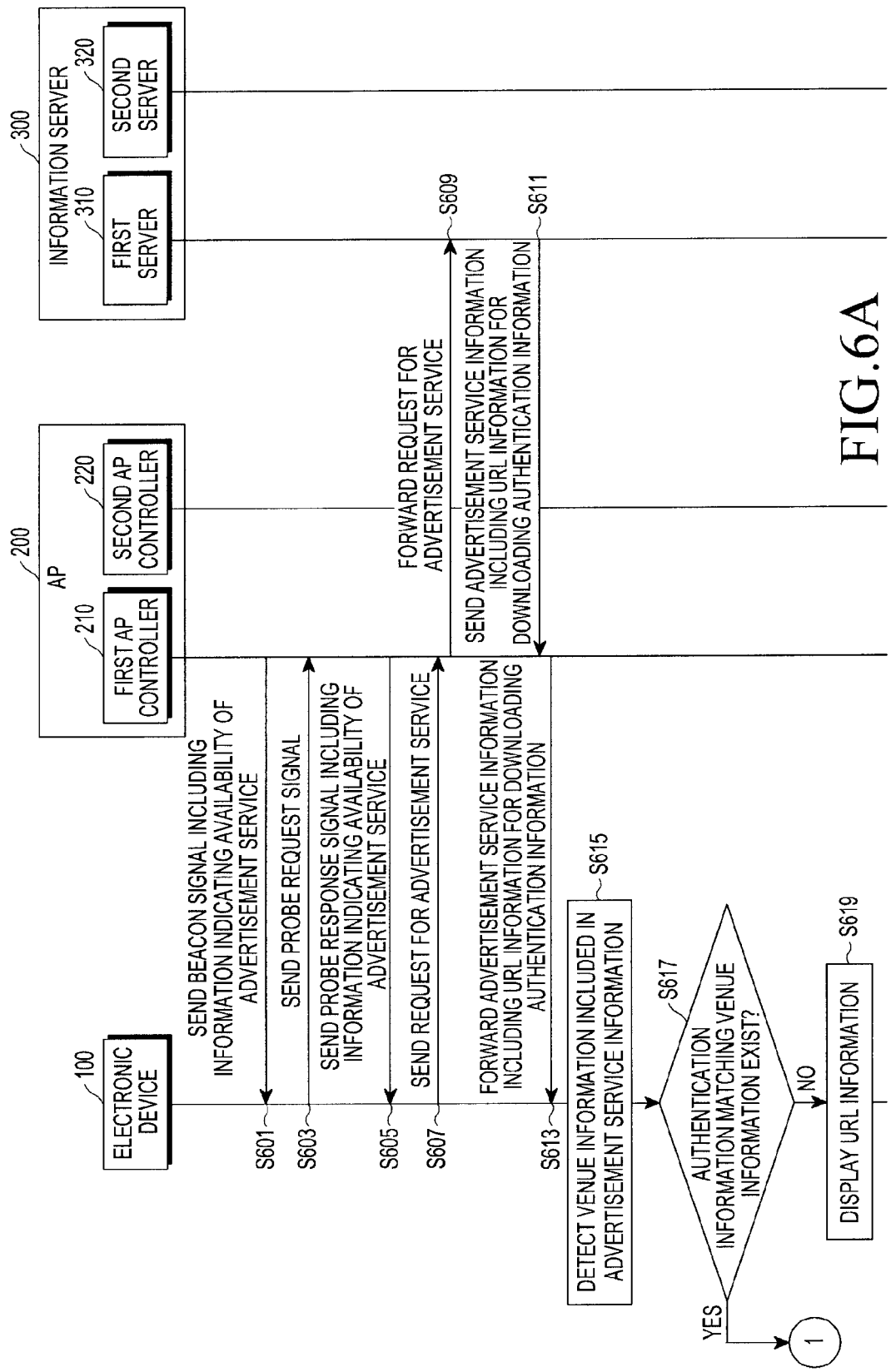
FIG. 6A and FIG. 6B are flowcharts illustrating a method for updating authentication information in an electronic device according to another embodiment of the present disclosure.
Figure 6B:
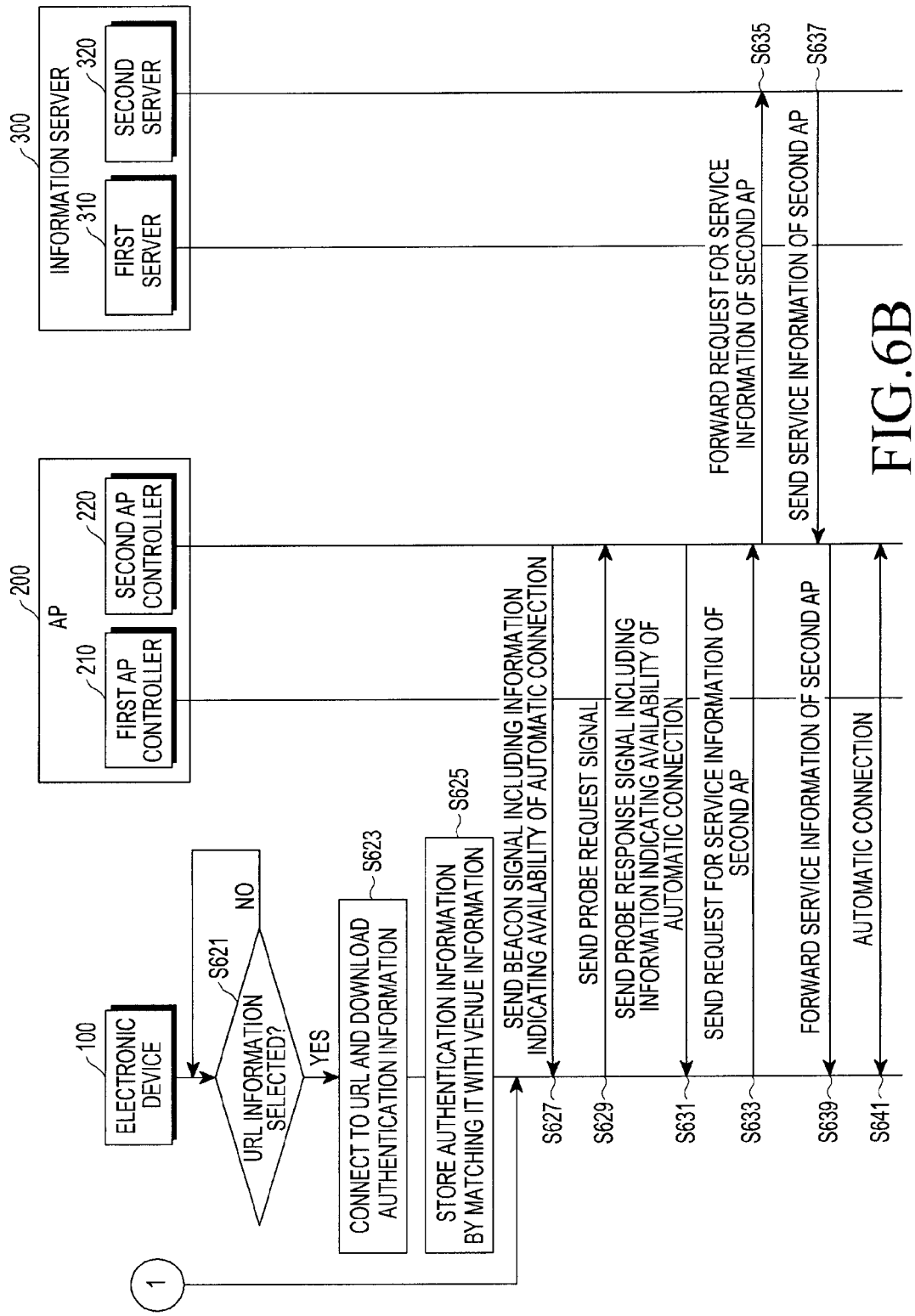

FIGS. 6A and 6B are flowcharts illustrating a method for updating authentication information in an electronic device, according to another embodiment of the present disclosure.

The embodiment will be explained in conjunction with FIGS. 1 to 5.

Referring to FIGS. 6A and 6B, in operation S601, the first AP 210 may periodically transmits a beacon signal that includes information indicating availability of advertisement services. In S603 if the electronic device 100 enters a Wi-Fi network area of a venue that supports 802.11u based advertisement services, the controller 110 scans for supported advertisement services.

During the step S603, the controller 110 may send a probe request signal, and in S605, the first AP 210 controller that receives the probe request signal sends the electronic device 100 a probe response signal that includes the information indicating availability of advertisement services.

If the controller 110 determines from the probe response signal received from the first AP controller 210 that the first AP 210 is able to provide advertisement services in step S607, the controller 110 transmits a request for an advertisement service to the first AP controller 210. The request for the advertisement service is sent to the first AP controller 210 via a GAS initial request, which is an action frame specified based on the 802.11u standard.

In S609, upon receiving the request for the advertisement service from the electronic device 100, the first AP controller 210 forwards the request for the advertisement service to the first server 310.

In response to the request for the advertisement service, in S611 the first server 310 sends the first AP 210 advertisement service information that includes information about a URL from which authentication information may be downloaded.

Upon reception of the advertisement service information including the URL information from the first server 210, in S613, the first AP 210 forwards the advertisement service information that includes the URL information to the electronic device 100. The advertisement service information forwarded from the first AP 210 to the electronic device 100 via a GAS initial response, which is an action frame specified based on the 802.11u standard.

Upon reception of the advertisement service information from the first AP 210, in S615 the electronic device 100 detects venue information from the advertisement service information.

In S617, the controller 110 determines whether there is authentication information stored in the memory 130 that matches the venue information.

Upon determining that there is no authentication information stored in the memory 130 that matches the venue information in operation 617, in S619 the controller 110 extracts the URL information from the advertisement service information for downloading authentication information, and displays the URL information for downloading necessary authentication information for connection to an AP that serves in the venue where the electronic device 100 is located in the display unit 160.

If determining that the URL information has been selected in S621, in S623 the controller 110 accesses the URL via data communication, downloads authentication information in step S623, and in S625 stores the authentication information in the memory 130 by matching it with the venue information extracted from the advertisement service information. When the controller 110 is connected to the URL, a page for downloading Hotspot 2.0 authentication information is displayed in the electronic device 100.

Since subsequent operations S627 to S641 after the authentication information is downloaded are the same as operations S321 to S335 of FIGS. 3A and 3B, described above, description of S627 to S641 will be not be repeated here.

According to embodiments, if determining that there is authentication information stored in the memory 130 that matches the venue information in operation 617, the controller 110 automatically connects the electronic device 100 to the second AP 220 using the authentication information stored in the memory 130 that matches the venue information in steps S627 to S641.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

According to various embodiments of the present disclosure, the electronic device and method for updating authentication information in the electronic device may improve usability by automatically accessing an AP without trouble to find out credential information from an administrator and make a manual access to the AP.

Several embodiments have been described above, but a person of ordinary skill in the art will understand and appreciate that various modifications can be made without departing the scope of the present invention. Thus, it will be apparent to those ordinary skilled in the art that the true scope of technical protection is only defined by the following claims.

What is claimed is:
1. An electronic device, comprising:
 a short-range communication unit configured to provide a short-range communication; and
 a controller configured to:
  detect update information for authentication information included in advertisement service information received from a server through an Access Point (AP) identified by the short-range communication unit,
  obtain authentication information using the update information, wherein the authentication information comprises an access password, and wherein obtaining the authentication information using the update information further comprises:
   extracting Uniform Resource Locator (URL) information for downloading authentication information from the advertisement service information and displaying the URL information, wherein the URL information includes a URL;
   when the update information includes the URL information and information about connection to the AP, accessing the URL through the AP;
   when the update information includes the URL information and does not include information about connection to the AP, accessing the URL without using the AP; and
   downloading the authentication information in response to accessing the URL;
  update a stored authentication information for automatically connecting using the obtain authentication information, and
  connect the electronic device to the AP that supports automatic connection based on the updated authentication information.

2. The electronic device of claim 1, wherein the controller is configured to detect update information from an AP and the AP includes a first AP controller configured to provide advertisement service information and a second AP controller configured to connect the electronic device using the authentication information,
 wherein the AP receives the advertisement service information including the update information for authentication information and AP information for connection to the AP from an information server connected to the AP, and
 wherein the information server includes a first server that provides the advertisement service information including the update information for authentication information and a second server that provides the AP information for connection to the AP.

3. The electronic device of claim 1, wherein the controller is configured to send a request for an advertisement service to an AP identified by the short-range communication unit; extract URL information for downloading authentication information from advertisement service information received from the AP in return for the request for the advertisement service and display the URL information; access the URL upon selection of the URL information; download the authentication information; and make a connection to the AP based on the downloaded authentication information.

4. The electronic device of claim 1, wherein the controller is configured to send a request for an advertisement service to an AP identified by the short-range communication unit; extract URL information for downloading authentication information and connection information to a public AP from advertisement service information received from the AP in return for the request for the advertisement service and display the URL information; connect the electronic device to the public AP based on the information relating to connection to the public AP upon selection of the URL information; access the URL by connecting to the public AP and download the authentication information; disconnect the public AP and the electronic device; and connect the electronic device to the AP based on the downloaded authentication information.

5. The electronic device of claim 1, wherein the controller is configured to send a request for an advertisement service to an AP identified through the short-range communication unit, the request including user information; extract URL information to download authentication information from advertisement service information received from the AP in response to the request for the advertisement service based on a validation of the user information, and display the URL information; access the URL upon selection of the URL information; download the authentication information; and connect the electronic device to the AP based on the downloaded authentication information.

6. The electronic device of claim 5, wherein if the user information is not valid, the controller is configured to receive advertisement service information that does not include URL information for downloading the authentication information from the AP in return for the request for the advertisement service.

7. The electronic device of claim 5, wherein the user information includes at least one of an ID valid for a venue where the electronic device is located and an unique ID of the electronic device, and
wherein whether the validation of the user information is determined based on whether the user information exists in a database (DB) of an information server connected to the AP.

8. The electronic device of claim 1, wherein the controller is configured to send a request for advertisement service to an AP identified by the short-range communication unit; detect venue information from advertisement service information received from the AP in return for the request for the advertisement service and determine whether there is stored authentication information that matches the venue information; and connect the electronic device to the AP using the authentication information stored if the stored authentication information matches the venue information.

9. The electronic device of claim 1, wherein the controller:
sends a request for the advertisement service to a first AP controller at the AP; and
sends a request for service information to a second AP controller at the AP, wherein the second controller provides Hotspot 2.0 functionality.

10. A method for updating authentication information in an electronic device, the method comprising:
detecting update information for authentication included in advertisement service information received from a identified Access Point (AP) identified by a short-range communication;
obtain authentication information using the update information, wherein the authentication information comprises an access password, and wherein obtaining the authentication information using the update information further comprises:
extracting Uniform Resource Locator (URL) information for downloading authentication information from the advertisement service information and displaying the URL information, wherein the URL information includes a URL;
when the update information includes the URL information and information about connection to the AP, accessing the URL through the AP;
when the update information includes the URL information and does not include information about connection to the AP, accessing the URL without using the AP; and
downloading the authentication information in response to accessing the URL;
update a stored authentication information for automatically connecting the electronic device and the AP, using the obtain authentication information, and
connecting the electronic device to the AP based on the update authentication information.

11. The method of claim 10, wherein the AP includes a first AP controller for providing advertisement service information and a second AP that is connected to the electronic device using the authentication information, and an information server comprises a first server and a second server,
receiving, by the AP the advertisement service information including the update information for authentication information and AP information for connection to the AP from an information server connected to the AP, and providing, by the first server, the advertisement service information including the update information for authentication information and
providing, by the second server the AP information for connection to the AP.

12. The method of claim 10, further comprising:
sending a request for an advertisement service to the identified AP;
extracting URL information for downloading authentication information from advertisement service information received from the AP in response to the request for the advertisement service;
displaying the URL information;
accessing the URL information and downloading the authentication information after selecting the URL information; and
connecting the electronic device to the AP based on the downloaded authentication information.

13. The method of claim 10, further comprising:
sending a request for an advertisement service to the identified AP;
extracting URL information for downloading authentication information and information about connection to a public AP from advertisement service received from the AP in response to the request for the advertisement service;
displaying the URL information;
selecting the URL information and connecting the electronic device to the public AP based on the information relating to connection to the public AP;
accessing, the URL through the public AP by connecting to the public AP and downloading the authentication information;
disconnect the public AP and the electronic device; and
connecting the electronic device to the AP using the downloaded authentication information.

14. The method of claim 10, further comprising:
transmitting a request for an advertisement service to the identified AP, the request including user information;
extracting URL information for downloading authentication information from advertisement service information received from the AP in response to the request if the user information is validated, and displaying the URL information;
accessing the URL and downloading the authentication information upon selection of the URL information; and
connecting the electronic device to the AP using the downloaded authentication information.

15. The method of claim 14, further comprising receiving advertisement service information that does not include URL information for downloading the authentication information from the AP in response to the request, if the user information is not validated.

16. The method of claim 14, wherein the user information includes at least one of an ID valid for a venue where the electronic device is located and an unique ID of the electronic device, and
determining whether the user information is valid based on whether the user information exists in a database (DB) of an information server connected to the AP.

17. The method of claim 10, further comprising:
sending a request for an advertisement service to the identified AP;
detecting venue information from advertisement service information received from the AP in return for the request for the advertisement service;

determining whether there is stored authentication information that is associated with the venue information; and making a connection to the AP using the stored authentication information if the stored authentication information is associated with the venue information.

18. The method of claim 10, further comprising:

sending a request for advertisement service from the electronic device to a first AP controller at the AP; and sending a request for service information from the electronic device to a second AP controller at the AP, wherein the second controller provides Hotspot 2.0 functionality.

* * * * *